United States Patent Office 3,401,092
Patented Sept. 10, 1968

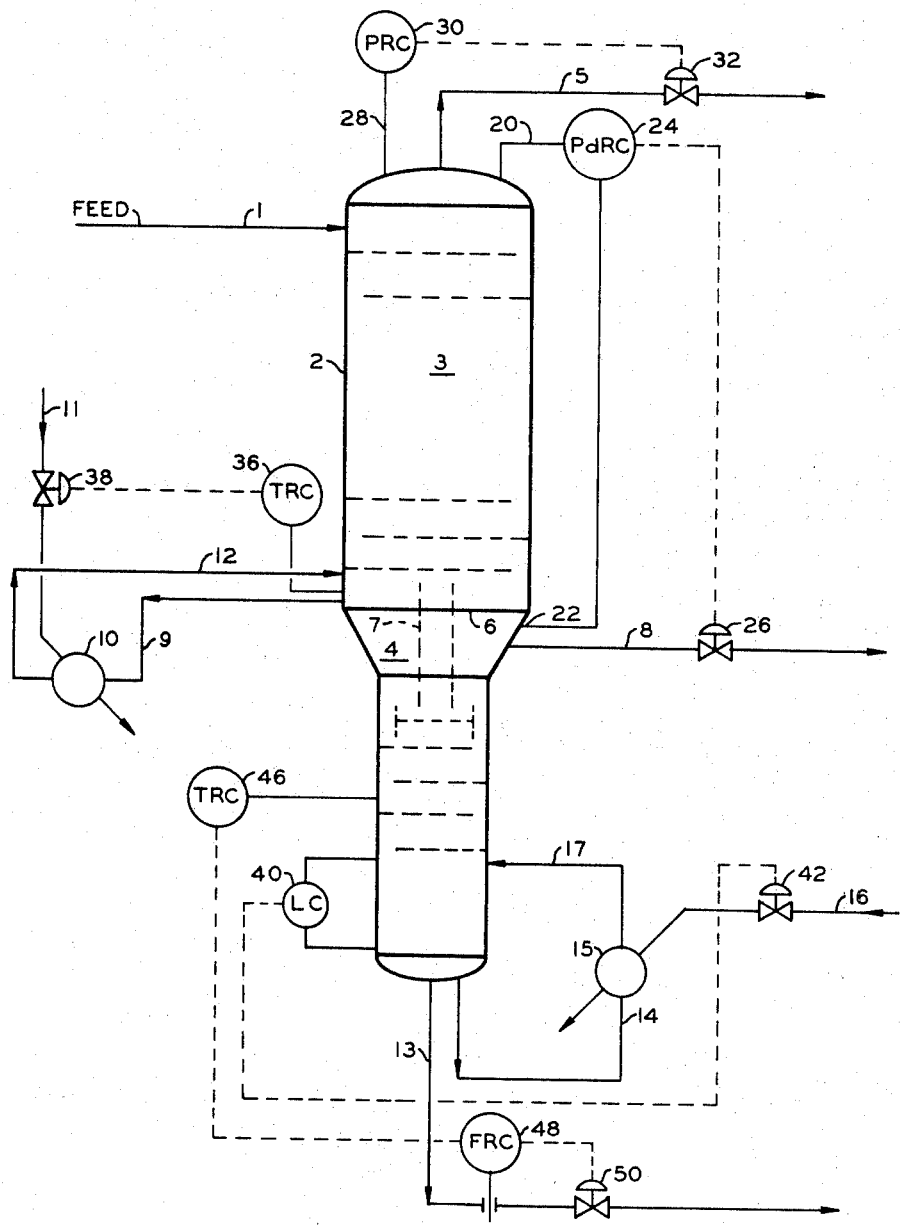

3,401,092
TWO-ZONE DISTILLATION PROCESS AND SYSTEM HAVING VAPOR FLOWS CONTROLLED BY THE PRESSURE DIFFERENTIAL
Romeo Matta, Bartlesville, Okla., assignor to Phillips Petroleum Company, a corporation of Delaware
Filed Apr. 22, 1966, Ser. No. 544,615
5 Claims. (Cl. 203—1)

ABSTRACT OF THE DISCLOSURE

A two-zone fractional distillation column adapted to separate at least two vaporous products and one liquid product is controlled by controlling the rate of withdrawal of a first vapor stream from the upper fractionation zone thereby maintaining pressure in the upper fractionation zone at a predetermined level, controlling the withdrawal of a second vaporous stream from the upper portion of the lower fractionation zone in response to the differential pressure between the first and second fractionation zone to thereby yield a predetermined difference in pressure between the first and second fractionation zone, maintaining the predetermined level of liquid in the lower fractionation zone by controlling the flow of a liquid product stream from the bottom thereof and maintaining the mixture in the lower fractionation zone at a predetermined level in response to heat supplied to the bottom fractionation zone and the temperature within the bottom fractionation zone.

This invention relates to a pressure control system. In one of its aspects, it relates to a method for controlling the pressure balance between the upper zone and lower zone of a two-zone fractionator, the method comprising removing vapors from the upper portion of the lower zone at a rate which is determined by the pressure differential sensed between the upper zone and the lower zone. In another of its aspects, the invention relates to a method of controlling the pressure balance between an upper zone and a lower zone of a two-zone fractionator as hereinbefore described wherein the pressure is sensed in the upper portion of the upper zone and the upper portion of the lower zone. In a still further aspect, the invention relates to a method of controlling the pressure balance between the upper zone and the lower zone of a two-zone fractionator as hereinbefore described wherein the temperature within the fractionator is maintained at a predetermined value. In a still further aspect, the invention relates to a method of controlling the pressure balance between an upper and lower zone of a two-zone fractionator as hereinbefore described wherein the pressure in the upper portion of the upper zone is maintained at a predetermined value by removing vapors from the upper portion of the upper zone in accordance with the pressure sensed in said upper zone. In another of its aspects, the invention relates to a method of controlling the pressure balance between the upper zone and lower zone of a two-zone fractionator as hereinbefore described wherein the two-zone fractionator is separated by a vapor impermeable plate having a downcomer pipe to pass liquid from the upper zone to the lower zone.

The invention also relates to an apparatus for controlling a pressure balance between an upper section and a lower section of a two section fractionator which is separated by a vapor impermeable plate and has a downcomer to pass liquid from the upper section to the lower section, and a means to remove vaporous product from the upper portion of the lower section, the apparatus comprising a means for sensing a pressure differential between the upper section and lower section of the fractionator, and means for regulating the vapor withdrawal from the upper portion of the lower section in accordance with the differential pressure sensed between the upper section and lower section. In a still further aspect, the invention relates to an apparatus for controlling the pressure balance between an upper section and a lower section of a fractionator as hereinbefore described wherein there is provided a means for maintaining the temperature in the upper section of the fractionator substantially constant, a means for maintaining the temperature in the lower section of said fractionator substantially constant. In a still further aspect, the invention relates to an apparatus for controlling the pressure balance between an upper section and a lower section of a fractionator as hereinbefore described wherein there is further provided a means for maintaining the pressure in the upper portion of the upper section of the fractionator substantially constant.

In Ser. No. 545,664, filed Apr. 27, 1966, there is disclosed and claimed a fractionation tower for separating hydrocarbon components. The tower has an upper section and a lower section, the two sections being divided by a vapor impermeable plate having a downcomer pipe adapted to pass liquid from the upper section to the lower section. There is a vapor withdrawal means in the upper portion of the lower section of the fractionator for removing a middle boiling product. The downcomer pipe in the apparatus requires that a delicate pressure balance be maintained between the upper section of the fractionator and the lower section of the fractionator. The column must be operated such that the pressure above the vapor impermeable plate is less than the pressure below the vapor impermeable plate so that a column of liquid is maintained in the downcomer pipe. If the pressure in the lower section becomes too great, vapor will be forced up through the downcomer pipe. If the vapor in the upper section becomes too great, vapor from the upper section will be forced down through the downcomer pipe, thus expelling all the liquid therein.

I have now discovered that the required pressure balance in this fractionation tower can be maintained by controlling at least one composition related function, such as temperature, within the column at a predetermined value, maintaining the pressure in the upper portion of the upper section at a predetermined value, and maintaining the pressure differential between the upper section and the lower section by sensing the differential pressure between the upper section and the lower section and regulating removal of vapor from the upper portion of the lower section in accordance with the pressure differential sensed and its desired value.

By various aspects of this invention, one or more of the following or other objects can be obtained.

It is an object of this invention to provide a method and means for maintaining the pressure balance between an upper and a lower section of a fractionator wherein vapor is removed as a side draw stream.

It is a further object of this invention to provide a method and means for separating isobutane from lighter and heavier components in a two section fractionator.

It is a still further object of this invention to provide a method and apparatus for controlling the operating conditions of a two section fractionator wherein liquid is removed at the bottom thereof, vapor is removed at the top of the upper portion of the lower section, and vapor is removed overhead from the upper portion of the upper section.

Other aspects, objects and the several advantages of this invention are apparent to one skilled in the art from a study of this disclosure, the drawing and the appended claims to the invention.

According to the invention, there is provided a control system for an apparatus described and claimed in copending Ser. No. 545,664, filed Apr. 27, 1966. The apparatus comprises a fractionator tower having an upper section and a lower section separated by a vapor impermeable plate having a downcomer pipe adapted to pass liquid therethrough. The apparatus further contains a means for removing overhead vapor from the upper section, means for removing vaporous product from the upper portion of the lower section, and means for removing liquid from the lower portion of the lower section. Means are further provided to reboil liquid in the upper section and means to reboil liquid in the lower section. According to the invention, a desired difference in pressure is maintained between the upper section and lower section by sensing the differential pressure between the two sections and controlling the rate of vaporous product removal in accordance with the differential pressure. A differential pressure controller can be used to maintain a predetermined differential pressure by regulating the amount of vaporous product removal from the lower section in accordance with the sensed differential pressure. According to a preferred embodiment of the invention, the bottom liquid temperature in the lower portion of the upper section and a tray temperature in the lower section are maintained at predetermined values. Further, the pressure in the upper portion of the upper section is maintained at a predetermined value by controlling the rate of withdrawal of the vaporous overhead product from that section according to the pressure sensed in the upper portion of the upper section.

The invention will now be described with reference to the accompanying drawing which shows an embodiment of the invention.

Referring now to the drawing, which will be described with regard to the separation of isobutane from lighter components and a $C_6$ alkylate, a feed passes through line 1 to the upper section 3 of fractionator 2. The upper section 3 comprises a plurality of conventional fractionator trays. Overhead vaporous products comprising some isobutane and mostly lighter components are removed from upper section 3 through line 5. Liquid accumulating in the lower portion of upper section 3 is circulated through line 9, passed through heat exchanger 10 which is heated by steam in line 11, through line 12 and back to upper section 3, the liquid being at least partially vaporized, thus providing stripping vapor. A vapor impermeable plate plate 6 separates upper section 3 from lower section 4. A downcomer pipe 7 is provided to allow liquid to pass from over the weir of vapor impermeable plate 6 into lower section 4 of fractionator 2. A level of liquid is maintained in downcomer pipe 7, this liquid level representing the pressure differential between the upper portion of lower section 4 and the lower portion of upper section 3. Vaporous product is removed through line 8 from lower section 4. Liquid product is removed from the bottom of section 4 through line 13. Liquid product is also circulated through line 14, passed through heater 15 supplied with steam from line 16, and through line 17 back to section 4, the liquid being at least partially vaporized, thus providing stripping vapor.

According to the invention, pressure sensing conduits from points 22 and 20 transmit the pressures in the upper portions of lower section 4 and upper section 3, respectively, to differential pressure recorder controller 24 wherein the difference between these two pressures is determined and employed as the measurement therein to maintain a predetermined differential pressure between 20 and 22. In accordance with the pressure differential determined in 24 and a desired, predetermined, set point differential pressure thereto, valve 26 is adjusted to maintain these two differential pressures equal. Should the differential pressure between 20 and 22 be greater than the predetermined value, differential pressure recorder controller 24 will open valve 26 to allow more vapor to pass through line 8. Conversely, should the pressure differential be too small between 20 and 22, differential pressure recorder controller 24 will close down valve 26 to allow less vapor to pass through line 8, thereby increasing the pressure in section 4. A third pressure sensing conduit 28 from the upper portion of section 3 transmits the pressure in the upper portion of section 3 to pressure recorder controller 30 which acts to maintain the pressure at 28 at a predetermined, set point value by regulating the flow of overhead vapors through line 5 accordingly. Should the pressure at 28 be too great, valve 32 will be opened to allow more vapor to pass through. The opposite action will occur if the pressure at 28 is less than the desired value. The temperature of the liquid in the lower reboiler portion of section 3 is sensed by temperature recorder controller 36 which, in accordance with a desirable predetermined value of temperature, controls the rate of heat input to the reboiler 10 for section 3 by adjusting valve 38 to allow more or less steam to pass through line 11. Further, temperature recorder controller 36 controls the heat input to the lower portion of upper section 3 to regulate the concentration of heavy component being carried up section 3 and to maintain a vapor-liquid balance in order to provide liquid for lower section 4. A tray temperature in lower section 4 is sensed by temperature recorder controller 46 which, in accordance with a desired, predetermined value of temperature, controls the rate of liquid withdrawal from the bottom of lower section 4 to maintain a desirable composition on the hereinbefore mentioned tray. Liquid level controller 40 senses the level of liquid in the bottom of section 4 and according to a predetermined value, will adjust valve 42 to allow more or less heat to pass through line 16 to reboiler 15 thereby manipulating the rate of vaporization of the reboiler liquid. The temperature of the liquid on a tray in section 4 is measured in temperature recorder controller 46 which, in accordance with a desired value of temperature, sends a signal to flow recorder controller 48 which adjusts the flow of liquid through line 13 by adjusting valve 50. If the temperature in the lower portion of section 4 becomes lower than the predetermined set point value, temperature recorder controller 46 will send a signal to flow recorder controller 48 which will close down valve 50, thus decreasing the flow of liquid through line 13. Thus, the level of liquid in the bottom of section 4 will rise causing level controller 40 to open valve 42 to allow more steam to pass through line 16 supplying more heat to reboiler 15 thus increasing the vaporization of the liquid passing through lines 14 and 17 and thereby reducing the liquid level, thus increasing the heat input to the lower portion of section 4.

The invention has been described as having pressure measuring point 20 at an upper location in section 3. However, it is within the scope of the invention to have pressure point 20 at any location between plate 6 and line 5 in section 3.

It is further within the scope of the invention to have temperature recorder controller 46 control the rate at which steam is supplied through line 16 and to have liquid level controller 40 controlling the rate of flow through line 13. It is further within the scope of this invention to provide a product analyzer in place of temperature recorder controller 46. The analyzer preferably would measure the isobutane concentration on a fractionator tray in section 4.

The control system of the invention is not limited to the apparatus disclosed in the copending patent application, Ser. No. 545,664, but is applicable in any process where it is sought to maintain a pressure balance between an upper and a lower section of a fractionator where there is a side vapor withdrawal line.

As an example of the use of this method and apparatus, in the separation of the hydrocarbon effluent stream from a reaction step wherein ethylene and isobutane are alkylated by a hydrogen chloride-promoted aluminum chloride complex catalyst, a two section fractionation column is employed to process approximately 4954 barrels per hour of feed stream. This column's upper section is 15 feet in diameter and contains 10 fractionating trays while the lower section is 13.5 feet in diameter and contains 50 fractionating trays.

The column's feed stream is comprised of 182 barrels per hour of propane and lighter, 3971 barrels per hour of butanes, predominately isobutane, and 801 barrels per hour of pentane are heavies alkylate, predominately isohexanes. Operating at 160 p.s.i.g. overhead pressure, the overhead vapor stream at 166° F. is removed to further separation steps as desired at a rate of 1799 barrels per hour and contains isobutane plus essentially all of the above-mentioned propane and lighter components. The side draw vapor stream at approximately 180° F. and 163 p.s.i.g. is removed at a rate of 2561 barrels per hour, comprising predominately isobutane, and is recycled directly to the reaction step. The bottoms liquid product at approximately 320° F. and 173 p.s.i.g. is removed at a rate of 594 barrels per hour, comprising predominately isohexanes alkylate product.

By means of temperature control of the reboiler heat input to the upper section of the column and in cooperation with pressure control of the upper section, the concentration of propane in the vapor side draw stream is regulated at less than one liquid volume percent. Indirect temperature control of the reboiler heat input to the lower section of the column is achieved by manipulating the bottoms product rate which directly affects the liquid level in the lower portion of the lower section which in turn regulates reboiler steam flow rate. In cooperation with the control of the 3.0 pounds per square inch differential pressure between the top of the lower section and the top of the upper section and the pressure control of the upper section (at 160 p.s.i.g.), this temperature control serves to regulate the concentration of isobutane at approximately 0.2 liquid volume percent in the alkylate product.

Operational stability of the vapor impermeable plate is maintained as the result of regulating the differential pressure at 3.0 p.s.i. This, turn, maintain a differential pressure of approximately 1.0 p.s.i. across the plate itself, which serves to support a liquid level of 3 to 4 feet of hot liquid in this downcomer, thus keeping it about half full. Thereby, capacity for variations in liquid down flow rate is provided to accommodate high rates without risking the loss of level in the downcomer at low rates which would allow vapors to pass up through this plate and into the top section thereby impairing the separating ability of the column sections.

Reasonable variation and modification are possible within the scope of the foregoing disclosure, the drawing and the claims to the invention, the essence of which is that there has been provided a control system for maintaining the differential pressure between an upper and lower section of a two section fractionator separated by a vapor impermeable plate with a downcomer adapted to pass liquid therethrough, the control system controlling the rate of vapor withdrawal in accordance with the measured and desired values of differential pressure between the upper section and the lower section.

I claim:

1. A method of controlling a fractionator having upper and lower fractional distillation zones wherein feed is passed to the upper zone, vaporous product streams are removed from said upper zone and the upper region of said lower zone and liquid product is removed from said lower zone comprising:
   (a) maintaining the temperature in said upper zone at a first predetermined temperature;
   (b) sensing the pressure in said upper zone, comparing the sensed pressure with a predetermined pressure and controlling the rate of withdrawal of vaporous product from said upper zone to yield said predetermined pressure;
   (c) measuring the difference in pressure between said upper and lower zones, comparing the difference in pressure with a predetermined pressure differential and regulating the flow of vaporous product from the upper region of said lower zone to yield said predetermined pressure differential;
   (d) maintaining the temperature in said lower zone at a second predetermined temperature.

2. The method of claim 1 wherein step (d) comprises sensing the temperature in said lower zone, comparing the sensed temperature with said second predetermined temperature, and controlling the rate of liquid product withdrawal from the bottom of said lower zone to yield said second predetermined temperature, and sensing the level of liquid in the lower portion of said lower zone, comparing the sensed level of liquid with a predetermined level of liquid, and controlling the amount of heat supplied to said lower zone to yield said predetermined level of liquid.

3. The method of claim 1 wherein step (d) comprises analyzing the concentration of the component on a tray in said lower zone, comparing the resulting analysis with a predetermined analysis and adjusting the flow of liquid product from the lower portion of said lower zone to yield said predetermined analysis, and sensing the level of liquid in the bottom portion of said lower zone, comparing the sensed level of liquid with a predetermined level of liquid and controlling the amount of heat supplied to said lower zone to yield said predetermined level of liquid.

4. A fractional distillation apparatus for controlling a fractionator having an upper section and a lower section, which sections are separated by a vapor impermeable plate which is adapted to pass liquid through a downcomer pipe therethrough, said fractionator having first conduit means to remove a vaporous overhead product from the upper portion of said upper section, second conduit means to remove liquid product from the lower portion of said lower section, third conduit means to remove a vaporous product from the upper portion of said lower section, means for supplying heat to said upper section and means to supply heat to said lower section, said fractional distillation control apparatus comprising:
   (a) a first pressure sensing means for sensing pressure in said upper section, first valve means positioned within said first conduit means, pressure controller means, said first pressure sensing means being operatively connected to said pressure controller means and said pressure controller means being operatively connected to said first valve means; (b) second pressure sensing means for sensing pressure in said lower section, third pressure sensing means for sensing pressure in said upper section, means for determining the difference in pressure between said upper section and said lower section, said means for determining the difference of pressure being operatively connected to said second and third pressure sensing means, differential pressure controller means, second valve means positioned within said third conduit means, said means for determining differential pressure being operatively connected to said differential pressure controller means, and said differential pressure controller means operatively connected to said second valve means; (c) means for maintaining the temperature in said upper section at a predetermined value; (d) means for maintaining the temperature in said lower section at a predetermined value.

5. The apparatus of claim 4 wherein said means for maintaining temperature of said lower section comprises a temperature sensing means positioned in said lower section, a temperature controller means, and a third valve means positioned with the said second conduit means, said temperature sensing means being operatively connected to said temperature controller means and said temperature controller means being operatively connected to said third valve means, means for sensing the level of liquid in said lower section, liquid level controller means, and means for controlling the amount of heat supplied to said lower section, said means for sensing the level of liquid being operatively connected to said liquid level controller means and said liquid level controller means being operatively connected to said means for controlling the amount of heat supplied to said lower section.

References Cited

UNITED STATES PATENTS

| | | | |
|---|---|---|---|
| 3,032,478 | 5/1962 | Bethea et al. | 203—2 |
| 3,130,027 | 4/1964 | Harper | 62—21 |
| 3,136,706 | 6/1964 | Harper | 203—1 X |
| 3,156,628 | 11/1964 | Larrison | 203—3 |
| 3,158,556 | 11/1964 | Hopper | 196—132 |
| 3,238,111 | 3/1966 | Harper | 203—2 |
| 3,264,365 | 8/1966 | Luken | 203—2 X |
| 3,296,121 | 1/1967 | Potts | 203—2 X |

WILBUR L. BASCOMB, JR., *Primary Examiner.*